Patented Dec. 13, 1932

1,890,485

UNITED STATES PATENT OFFICE

WALTER O. AMSLER, OF TOLEDO, OHIO, ASSIGNOR TO PAUL R. CARUTHERS, TRUSTEE, OF GLENSHAW, PENNSYLVANIA

METHOD OF TREATING METAL

No Drawing.   Application filed November 6, 1929.   Serial No. 405,286.

My invention relates to a method of treating metals, and more particularly to the making of steel.

In the making of steel, by the open hearth process for example, where it is common practice to introduce pig iron and scrap into the furnace, the completed product, while usually quite hard, is brittle. This brittleness is largely due to the presence of nitrogen or nitrides with which even the best grades of pig iron are contaminated, and which are undoubtedly augmented by absorption from the furnace gases.

The object of my invention is to produce a steel that while it possesses the hardness of steels made by the present processes, is nevertheless quite tough and much less brittle than ordinary steel.

In order to eliminate the nitrogen, which is at least partially responsible for the brittleness in hard steels, I introduce into the furnace an aluminous material such as bauxite or highly aluminous clay. The alumina has an affinity for nitrogen at high temperatures.

In the manufacture of steel by my process, the furnace is first charged in the usual manner with lime, steel, scrap, or pig iron and scrap. The fluxing materials as hereinafter described are then scattered upon the charge within the furnace and the batch melted as usual.

For each one hundred pounds of scrap and pig iron, I introduce into the furnace approximately

|               | Pounds |
|---------------|--------|
| Bauxite       | ¾      |
| Feldspar      | 1      |
| Lime          | 1      |

The feldspar and lime combine to form a fluid which will carry the alumina in solution so that it comes into more intimate contact with the metal. The added ingredients will melt and become intermixed with the metal and ebullition of the mixture occurs, which makes for intimate contact between the aluminous ingredient and the metal, whereby the nitrogen is absorbed by and the nitrides amalgamated with the aluminum oxide. The added ingredients, including the alumina oxide and the nitrides which have been amalgamated therewith at the completion of the melting operation are removed as dross or slag.

Instead of feldspar, any silicate with an acid reaction may be employed, and if such silicate contains some alumina in combination, as does feldspar, it is advantageous.

By the terms "bauxite" and "feldspar", I refer to commonly accepted compositions as set forth below:

| Bauxite | Per cent | Feldspar | Per cent |
|---|---|---|---|
| $Al_2O_3$ | 50 | $Al_2O_3$ | 15 |
| $Fe_2O_3$ | 25 | $SiO_2$ | 65 |
| $SiO_2$ | 21 | $CaO$ | 10 |
| $TiO_2$ | 1 | ($Na_2O$ or | |
| $H_2O$ | 3 | $K_2O$) | 10 |
| | 100 | | 100 |

The lime may properly be 95% pure CaO.

Thus, ¾ pounds bauxite would contain approximately .37½ pounds $Al_2O_3$ and .15 pounds $SiO_2$, while one pound of feldspar would contain .15 pounds $Al_2O_3$, and .65 pounds $SiO_2$.

Therefore, a mixture containing ¾ pounds bauxite, one pound feldspar and one pound lime would, if the constituents of these materials were separated, contain the following:—

| $Al_2O_3$ | CaO | $SiO_2$ | Alkalais ($Na_2O$ or $K_2O$) |
|---|---|---|---|
| .375 | .95 | .65 | .10 |
| .15 | .10 | .15 | |
| .525 | 1.05 | .80 | .10 |

As above stated, the aluminum oxide is the active reagent for removing the nitrogen and producing toughness in the steel product.

The invention may be of course employed in connection with various steel processes, including crucible steel furnaces and with electric furnaces. In the former case, the flux materials are added to the charge in the crucible, while in the case of electric furnaces, the procedure is as described in connection with open hearth furnaces.

The invention is applicable also to the production of any alloy steel, and is of particular utility in the production of tool steels and other high grade steels. In addition to an unusual toughness, steel produced by this process shows a greatly increased resistance to oxidation or rust.

I claim as my invention:—

1. The method of removing nitrogenous impurities from steel, which comprises adding to approximately each 100 lbs. of the metal batch, a refining mixture comprising bauxite, ¾ lb.; feldspar 1 lb., and lime 1 lb.

2. The method of removing nitrogenous impurities from steel, which comprises adding to approximately each 100 lbs. of the metal batch, refining materials comprising aluminum oxide, .525 lbs.; silicon dioxide .80 lbs., and lime 1.05 lbs.

In testimony whereof I, the said WALTER O. AMSLER, have hereunto set my hand.

WALTER O. AMSLER.